United States Patent
Uchino et al.

(10) Patent No.: US 12,150,177 B2
(45) Date of Patent: Nov. 19, 2024

(54) USER EQUIPMENT AND BASE STATION APPARATUS

(71) Applicant: NTT DOCOMO, INC., Tokyo (JP)

(72) Inventors: Tooru Uchino, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 531 days.

(21) Appl. No.: 17/425,657

(22) PCT Filed: Feb. 1, 2019

(86) PCT No.: PCT/JP2019/003756
§ 371 (c)(1),
(2) Date: Jul. 23, 2021

(87) PCT Pub. No.: WO2020/157993
PCT Pub. Date: Aug. 6, 2020

(65) Prior Publication Data
US 2022/0104269 A1    Mar. 31, 2022

(51) Int. Cl.
*H04W 74/0833*    (2024.01)
*H04W 76/11*    (2018.01)

(52) U.S. Cl.
CPC ........ *H04W 74/0833* (2013.01); *H04W 76/11* (2018.02)

(58) Field of Classification Search
CPC .......................... H04W 74/0833; H04W 76/11
See application file for complete search history.

(56) References Cited

U.S. PATENT DOCUMENTS

| | | | |
|---|---|---|---|
| 2018/0279186 A1 | 9/2018 | Park et al. | |
| 2020/0107372 A1* | 4/2020 | Agiwal | H04W 24/08 |
| 2022/0110165 A1* | 4/2022 | Uchino | H04W 74/0866 |
| 2024/0188096 A1* | 6/2024 | Kim | H04L 5/0005 |

FOREIGN PATENT DOCUMENTS

| | | |
|---|---|---|
| JP | 2018-527811 A | 9/2018 |
| WO | 2018/064367 A1 | 4/2018 |

OTHER PUBLICATIONS

R2-1817064 ZTE "Msg2 payload contents for 2-step RACH" 3GPP WG2 #104 Spokane Nov. 12-16, 2018 (Year: 2018).*
Extended European Search Report issued in European Application No. 19912249.0 mailed on Jul. 14, 2022 (8 pages).
(Continued)

*Primary Examiner* — Basil Ma
(74) *Attorney, Agent, or Firm* — Osha Bergman Watanabe & Burton LLP

(57) ABSTRACT

User equipment includes a transmitter configured to transmit a random access preamble or an identifier of the user equipment to a base station apparatus in a two-step random access procedure, a receiver configured to receive a response signal corresponding to at least one of the random access preamble and the identifier of the user equipment, and a downlink signal based on the response signal, from the base station apparatus, and a control unit configured to determine that a contention resolution is successful when information included in the downlink signal matches a part of or all of the identifier of the user equipment.

3 Claims, 9 Drawing Sheets

(56) References Cited

OTHER PUBLICATIONS

ZTE Corporation, Sanechips, "Msg2 payload contents for 2-step RACH", 3GPP TSG-RAN WG2 Meeting #104, R2-1817064, Spokane, USA, Nov. 12-16, 2018 (9 pages).
Vivo, "RAN2 impacts of 2-step RACH", 3GPP TSG-RAN WG2 Meeting #104, R2-1818260, Spokane, USA, Nov. 12-16, 2018 (5 pages).
Office Action issued in counterpart Japanese Patent Application No. 2020-569339 mailed on Apr. 4, 2023 (5 pages).
International Search Report issued in PCT/JP2019/003756 on Apr. 23, 2019 (3 pages).
Written Opinion of the International Searching Authority issued in PCT/JP2019/003756 on Apr. 23, 2019 (3 pages).
Ericsson; "Random Access enhancements"; 3GPP TSG-RAN WG2 #95bis, Tdoc R2-166826; Kaohsiung, Taiwan; Oct. 10-14, 2016 (5 pages).
3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).
3GPP TS 38.321 V15.4.0; "3rd Generation Partnership Project; Technical Specification Group Radio Access Network; NR; Medium Access Control (MAC) protocol specification (Release 15)"; Dec. 2018 (77 pages).
Office Action issued in Chinese Patent Application No. 201980090410.0 mailed on Oct. 11, 2023 (14 pages).
Office Action issued in Chinese Patent Application No. 201980090410.0 mailed on Feb. 29, 2024 (10 pages).
Ericcson; "On Two-step Random Access and Random Access Latency"; 3GPP TSG-RAN WG2 NR Ad hoc, Tdoc R2-1700413; Spokane, Washington, USA; Jan. 17-19, 2017 (6 pages).
ZTE, ZTE Microelectronics; "Consideration on the two-step RACH in NR"; 3GPP TSG-RAN WG2 NR Ad hoc, R2-1700155; Spokane, Washington, USA; Jan. 17-19, 2017 (7 pages).

* cited by examiner

FIG.6

| | | |
|---|---|---|
| R | Timing Advance Command | Oct 1 |
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

FIG.7

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |

USER EQUIPMENT AND BASE STATION APPARATUS

TECHNICAL FIELD

The present invention relates to user equipment and a base station in a radio communication system.

BACKGROUND ART

In NR (New Radio) that is a successor system of LTE (Long Term Evolution) (which is also called 5G), a technology that satisfies a large capacity system, high data transmission speed, low delay, concurrent connections of many terminals, low cost, power saving, and the like, as required conditions, has been discussed (e.g., Non-Patent Document 1).

As in LTE, NR performs a random access for establishing synchronization between user equipment and a base station apparatus or for a scheduling request. There are two types of random access procedures: contention based random access (CBRA) and contention free random access (CFRA) (e.g., Non-Patent Document 2).

PRIOR ART DOCUMENT

Non-Patent Documents

Non-Patent Document 1: 3GPP TS 38.300 V15.4.0 (2018-12)
Non-Patent Document 2: 3GPP TS 38.321 V15.4.0 (2018-12)

SUMMARY OF THE INVENTION

Problem to be Solved by the Invention

In a contention based random access procedure of an NR radio communication system, a two-step random access procedure has been discussed in addition to a conventional four-step random access procedure. As a two-step random access procedure is a contention based random access procedure, it is necessary to perform contention resolution.

The present invention is made in view of the points described above, and an object of the present invention is to perform contention resolution in a contention based random access procedure.

Means for Solving Problem

According to a disclosed technology, user equipment including a transmitter configured to transmit a random access preamble or an identifier of the user equipment to a base station apparatus in a two-step random access procedure, a receiver configured to receive a response signal corresponding to at least one of the random access preamble and the identifier of the user equipment, and a downlink signal based on the response signal, from the base station apparatus, and a control unit configured to determine that a contention resolution is successful when information included in the downlink signal matches a part of or all of the identifier of the user equipment, is provided.

Effect of the Invention

According to a disclosed technology, contention resolution can be performed in a contention based random access procedure.

BRIEF DESCRIPTION OF DRAWINGS

FIG. 6 is a diagram illustrating an example of a Msg2 of a four-step random access procedure;
FIG. 7 is a diagram illustrating an example of a Msg4 of a four-step random access procedure.

MODE(S) FOR CARRYING OUT THE INVENTION

Embodiments of the present invention are described below with reference to the drawings. The embodiments described below are examples, and an embodiment to which the present invention can be applied is not limited to these embodiments.

When a radio communication system of an embodiment of the present invention operates, an existing technology can be used appropriately. The existing technology is existing LTE for example, however the existing technology is not limited to the existing LTE. "LTE" in the present specification indicates a broad sense of the LTE unless otherwise described, which includes LTE-Advanced and systems after LTE-Advanced (e.g., NR).

In the following embodiment described below, terms such as an SS (Synchronization signal), a PSS (Primary SS), SSS (Secondary SS), a PBCH (Physical broadcast channel), and a PRACH (Physical random access channel), which are used in the existing LTE, are used. These terms are used for convenience of explanation, and similar signals, functions, and so on may be differently termed. In NR, the respective terms described above correspond to an NR-SS, an NR-PSS, an NR-SSS, an NR-PBCH, an NR-PRACH, and so on. However, "NR-" is not necessarily specified even if a signal is used for NR.

In an embodiment of the present invention, a duplex method may be a TDD (Time Division Duplex) method, may be an FDD (Frequency Division Duplex) method, or may be another method (e.g., Flexible Division duplex).

In an embodiment of the present invention, a description that a radio parameter or the like is configured may indicate that a predetermined value is pre-configured, or may indicate that a radio parameter sent from a base station apparatus 10 or user equipment 20 is configured.

Figure 1:
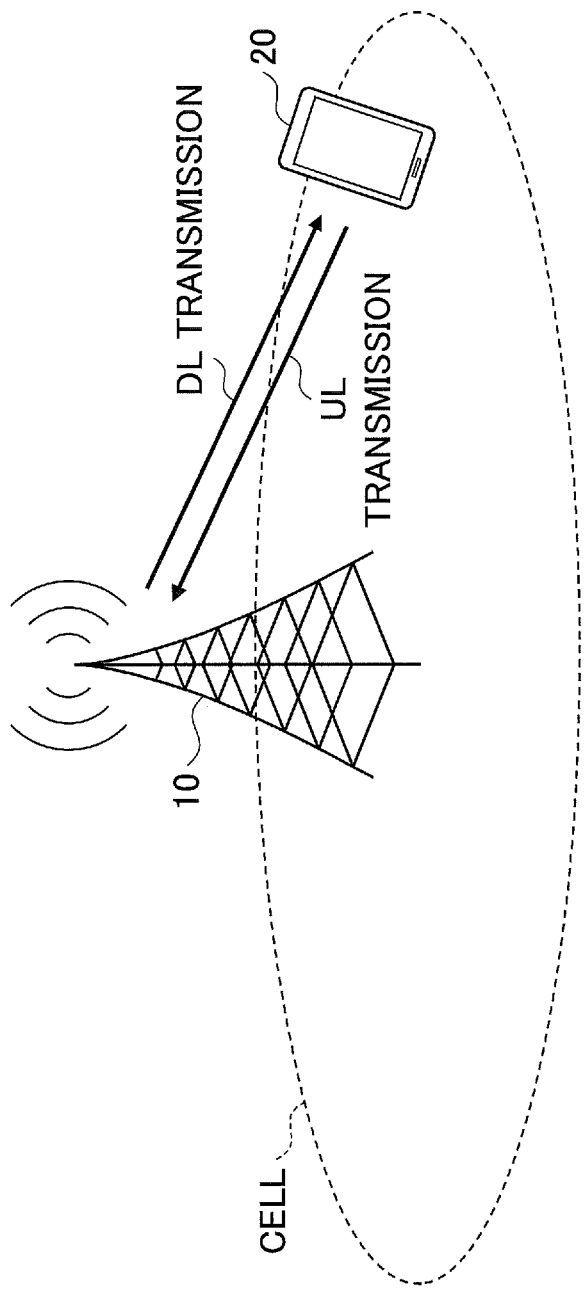
FIG. 1 is a diagram for describing a radio communication system according to an embodiment of the present invention.

FIG. 1 is a diagram for describing a radio communication system according to an embodiment of the present invention. As illustrated in FIG. 1, a radio communication system according to an embodiment of the present invention includes the base station apparatus 10 and the user equipment 20. In FIG. 1, one base station apparatus 10 and one user equipment 20 are illustrated, but this is an example, and multiple base station apparatuses 10 and multiple user equipment 20 may exist.

The base station apparatus 10 provides one or more cells, and is a communication apparatus that performs radio communication with the user equipment 20. A physical resource of a radio signal is defined by a time domain and a frequency domain. The time domain may be defined by the number of OFDM symbols and the frequency domain may be defined by the number of subcarriers or the number of resource blocks. The base station apparatus 10 transmits a synchronization signal and system information to the user equipment 20. A synchronization signal is, for example, an NR-PSS or an NR-SSS. System information is transmitted by an NR-PBCH, for example, and is also referred to as broadcast information. As illustrated in FIG. 1, the base station apparatus 10 transmits a control signal or data by DL (downlink) to the user equipment 20, and receives a control signal or data by UL (uplink) from the user equipment 20. Both the base station apparatus 10 and the user equipment 20 can perform beamforming to transmit and receive a signal. Both the base station apparatus 10 and the user equipment 20 can apply MIMO (Multiple Input Multiple Output) communication to DL or UL. Both the base station apparatus 10 and the user equipment 20 may communicate through SCell (Secondary Cell) and PCell (Primary Cell) of CA (Carrier Aggregation).

The user equipment 20 is a communication device having a wireless communication function, such as a smartphone, a mobile phone, a tablet, a wearable terminal, a communication module for M2M (Machine-to-Machine). As illustrated in FIG. 1, the user equipment 20 uses various communication services provided by a wireless communication system by receiving a control signal or data by DL from the base station apparatus 10, and transmitting a control signal or data by UL to the base station apparatus 10.

In a random access procedure performed for establishing synchronization between the user equipment 20 and the base station apparatus 10 or for a scheduling request, for example, the user equipment 20 transmits a random access preamble or a UE (User Equipment) identifier to the base station apparatus 10 as a UL signal, and the base station apparatus 10 transmits a random access response and information that performs contention resolution to the user equipment 20 as a DL signal.

Figure 2:
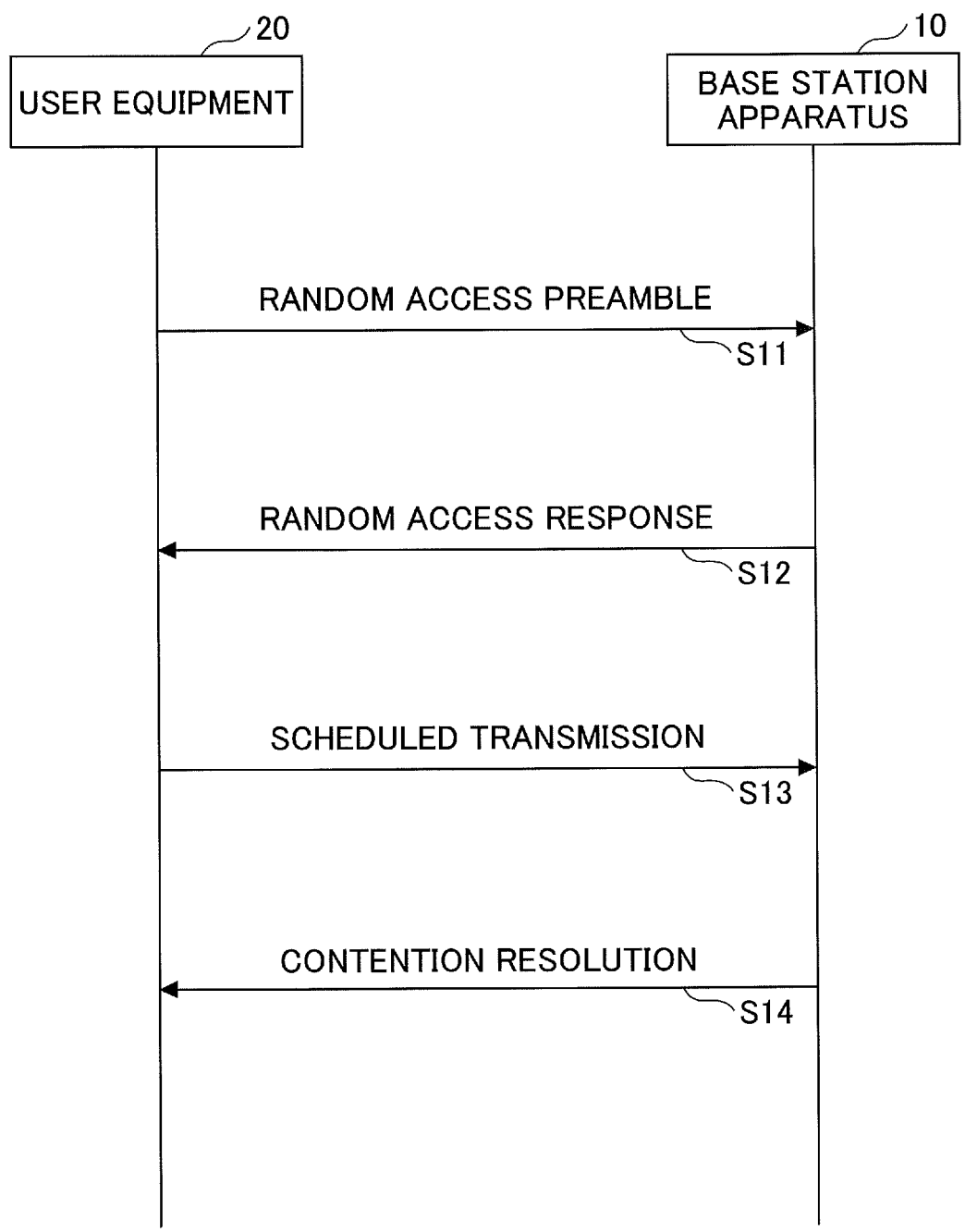
FIG. 2 is a sequence diagram for describing a first example of a random access procedure.

FIG. 2 is a sequence diagram for describing a first example of a random access procedure. An example of a random access procedure illustrated in FIG. 2 is a contention based random access procedure. When a contention based random access procedure starts, in step S11, the user equipment 20 transmits a random access preamble to the base station apparatus 10. In step S12, the base station apparatus 10 transmits a random access response to the user equipment 20. In step S13, the user equipment 20 performs a transmission scheduled by the random access response to the base station apparatus 10. By the scheduled transmission, information that identifies the user equipment 20 is transmitted. In step S14, the base station apparatus 10 transmits information for performing contention resolution to the user equipment 20. When the contention resolution is successful, the random access procedure completes with success.

Figure 3:
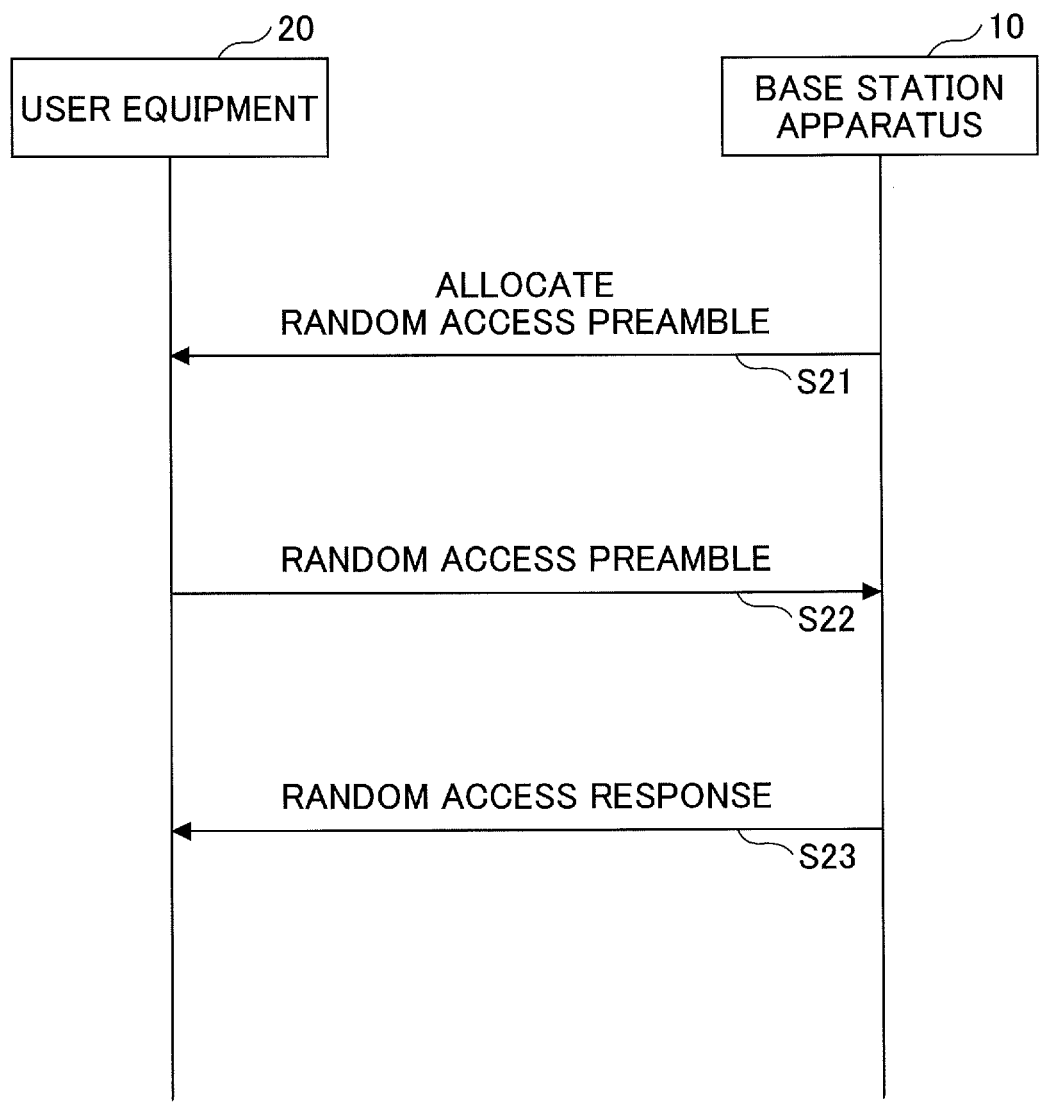
FIG. 3 is a sequence diagram for describing a second example of a random access procedure.

FIG. 3 is a sequence diagram for describing a second example of a random access procedure. An example of a random access procedure illustrated in FIG. 3 is a contention free random access procedure. When a contention free random access procedure starts, in step S21, the base station apparatus 10 allocates a random access preamble to the user equipment 20. In step S22, the user equipment 20 transmits the allocated random access preamble to the base station apparatus 10. Next, the base station apparatus 10 transmits a random access response to the user equipment 20.

Figure 4:
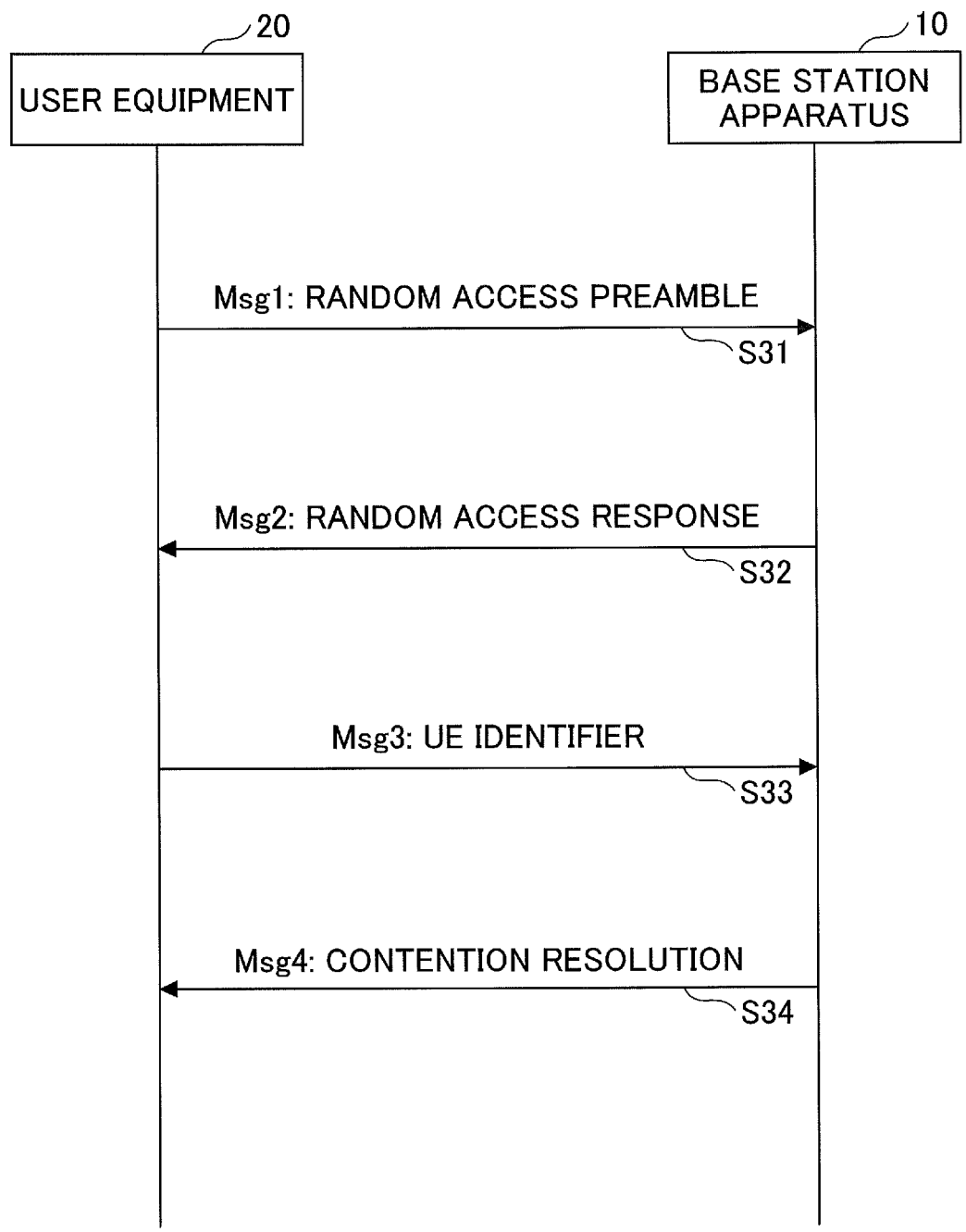
FIG. 4 is a sequence diagram for describing an example of a four-step random access procedure.

FIG. 4 is a sequence diagram for describing an example of a four-step random access procedure. An example of a random access procedure illustrated in FIG. 4 is a contention based random access procedure, similarly as illustrated in FIG. 2, and is a four-step random access procedure. In step S31, the user equipment 20 transmits a random access preamble to the base station apparatus 10 as a Msg1. In step S32, the base station apparatus 10 transmits a random access response to the user equipment 20 as a Msg2. In step S33, the user equipment 20 transmits a UE identifier to the base station apparatus 10 as a Msg3. Next, the base station apparatus 10 transmits information for performing contention resolution to the user equipment 20 as a Msg4. When the contention resolution is successful, the random access procedure completes with success.

Figure 5:
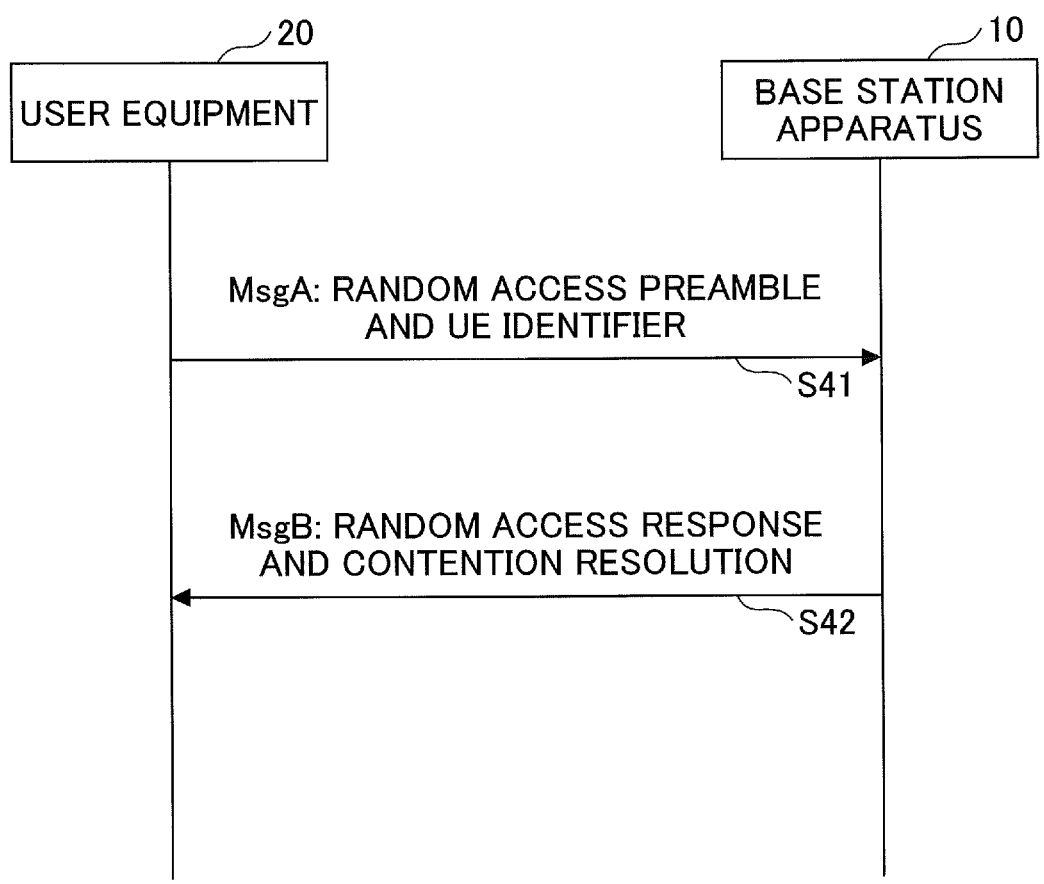
FIG. 5 is a sequence diagram for describing an example of a two-step random access procedure.

FIG. 5 is a sequence diagram for describing an example of a two-step random access procedure. An example of a random access procedure illustrated in FIG. 5 is a contention based random access procedure, and is a two-step random access procedure. A two-step random access procedure has been discussed for completing a random access procedure in a short time. In step S41, the user equipment 20 transmits a random access preamble and a UE identifier to the base station apparatus 10 as a MsgA. In step S42, the base station apparatus 10 transmits a random access response and information for performing contention resolution to the user equipment 20 as a MsgB. When the contention resolution is successful, the random access procedure completes with success. In step S41, either the random access preamble or the UE identifier may be transmitted as the MsgA.

FIG. 6 is a diagram illustrating an example of a Msg2 of a four-step random access procedure. As illustrated in FIG. 6, the Msg2 that is a MAC (medium Access Control) payload of a random access response includes "Timing Advance Command", "UL Grant", and "Temporary C-RNTI". "R" indicates a reserved bit.

"Timing Advance Command" is a parameter that determines timing of a UL transmission. In the base station apparatus 10, timing when the base station apparatus 10 receives the UL transmitted from each user equipment 20 is adjusted to be within a predetermined range. "UL Grant" is a parameter that performs a scheduling of the UL. Based on "UL Grant", the user equipment 20 transmits the Msg3 in the UL. "Temporary C-RNTI" is a temporary C-RNTI (Cell-Radio Network Temporary Identifier). When the contention resolution is successful by the Msg4, "Temporary C-RNTI" is used as a C-RNTI.

FIG. 7 is a diagram illustrating an example of a Msg4 of a four-step random access procedure. As illustrated in FIG. 7, the Msg4 that is the contention resolution includes "UE Contention Resolution Identity". The user equipment 20 determines that the contention resolution is successful when a received "UE Contention Resolution Identity" corresponds to information transmitted in the Msg3. That is, when the Msg3 including a CCCH SDU is transmitted, the contention resolution is determined to be successful when a PDCCH transmitting the Msg4 is addressed to a Temporary C-RNTI and includes a part of the transmitted CCCH SDU. In the following, a random access procedure that performs the contention resolution described above is referred to as a random access procedure using a CCCH SDU.

When the Msg3 including a C-RNTI is transmitted, the contention resolution is determined to be successful when a PDCCH by which the Msg4 is transmitted is addressed to a C-RNTI, or is addressed to a C-RNTI and includes a UL grant. In the following, a random access procedure that performs the contention resolution described above is referred to as a random access procedure without using a CCCH SDU.

Contents of the MsgB in a two-step random access procedure are assumed to be information corresponding to contents of the Msg2 and contents of the Msg4 in a four-step random access procedure.

However, it is not clarified how to include information defined in the Msg2 or the Msg4 of a four-step random access procedure in the MsgB. In the following, a random access procedure without using a CCCH SDU will be described in FIG. 8, and a random access procedure using a CCCH SDU will be described in FIG. 9.

Figure 8:
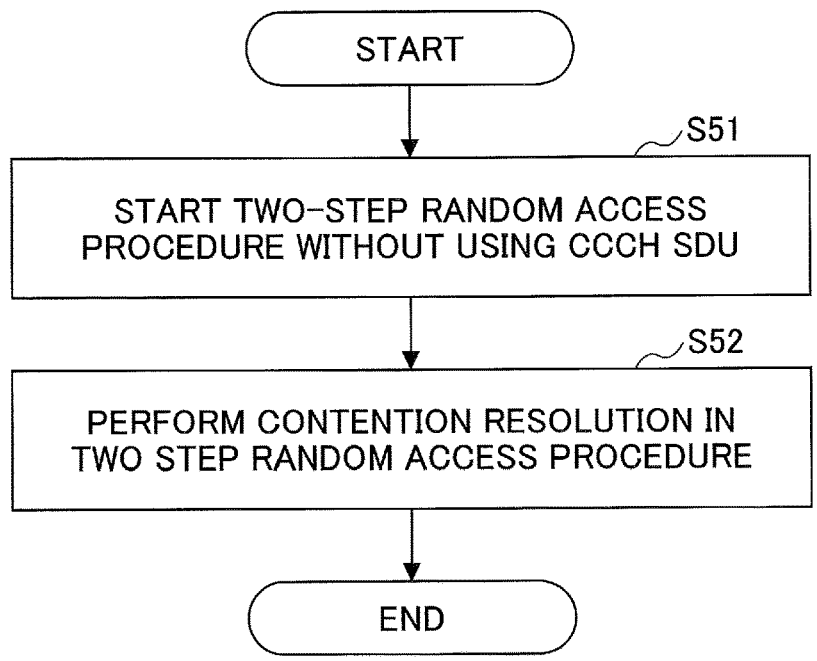
FIG. 8 is a flow chart for describing a first example of a random access procedure according to an embodiment of the present invention.

FIG. 8 is a flow chart for describing a first example of a random access procedure according to an embodiment of the present invention. By using FIG. 8, a two-step random access without using a CCCH SDU will be described.

In step S51, the user equipment 20 starts a two-step random access procedure without using a CCCH SDU. In step S52, the user equipment 20 performs a contention resolution in a two-step random access procedure.

The contention resolution in step S52 may be performed by a method described in the following 1) to 3).

1) The user equipment 20 receives a random access response scrambled by a C-RNTI, which is the MsgB. A PDCCH of the MsgB may be scrambled by a C-RNTI, a PDSCH of the MsgB may be scrambled by a C-RNTI, and both a PDCCH and a PDSCH of the MsgB may be scrambled by a C-RNTI. The user equipment 20 determines a contention resolution addressed to itself based on a decoded result of a DL signal, similarly in the Msg4 of a four-step random access procedure. The user equipment 20 determines that the contention resolution is successful when decoding the MsgB is successful by assuming being scrambled by a C-RNTI.

2) The user equipment 20 receives the MsgB similar to the Msg2, and determines that the contention resolution is successful by reading a "Temporary C-RNTI" field as a C-RNTI in a two-step random access procedure. That is, a meaning of a field is changed between a four-step random access procedure and a two-step random access procedure. The MsgB similar to the Msg2 may be a MsgB using a PDU (Protocol Data Unit) format (i.e., a payload of a random access response) of an existing Msg2 (i.e., a random access response), and may be a MsgB using a part of or all of information corresponding to information transmitted by an existing Msg2. "In a two-step random access procedure" may indicate "when a MsgB is expected to be received in a random access", may indicate "when a MsgA is transmitted", and may indicate "in a specific RRC procedure or a MAC procedure or the like (i.e., a procedure that triggers a two-step random access procedure)".

3) The user equipment 20 determines that the contention resolution is successful by a C-RNTI MAC CE being indicated in a new field of the MsgB. The new field may be arranged in a payload of a random access response, or the C-RNTI MAC CE may be transmitted by another MAC PDU. When the C-RNTI MAC CE is transmitted by another MAC PDU, resource allocation information of another MAC PDU may be indicated by a payload of a random access response.

Here in 2) described above, only by reading a "Temporary C-RNTI" field as a C-RNTI, a user equipment 20 performing a four-step random access procedure might receive a MsgB addressed to a user equipment 20 performing a two-step random access procedure, as a Msg2 addressed to itself. Thus, one of methods described in the following a), b), and c) may be applied.

a) Resource positions of a time domain or a frequency domain of a random access preamble are separated in a two-step random access procedure and in a four-step random access procedure. Consequently, random access responses RA-RNTI (Random Access-RNTI) are separated, and a Msg2 or a MsgB can be distinguished.

b) In a two-step random access procedure, a predetermined offset is added to a RA-RNTI, and a RA-RNTI in a four-step random access procedure and a RA-RNTI in a two-step random access procedure are separated. Consequently, a Msg2 or a MsgB can be distinguished.

c) In a random access response, information indicating whether a two-step random access procedure is being performed or a four-step random access procedure is being performed may be indicated. For example, a field of a MAC sub header of a random access response may be used for the indication, and a bit included in a payload of a random access response (e.g., a R bit) may be used for the indication. For example, information in a random access response indicating whether a two-step random access procedure is being performed or a four step random access procedure is being performed may be information indicating whether a response message is for a two-step random access procedure or for a four-step random access procedure, may be information indicating whether a message is an existing Msg2, and may be information indicating whether a message is a MsgB. Furthermore, for example, when information in a random access response indicating whether a two-step random access procedure is being performed or a four step random access procedure is being performed is not indicated, a message may be considered as an existing Msg2, or may be considered as a MsgB.

Figure 9:
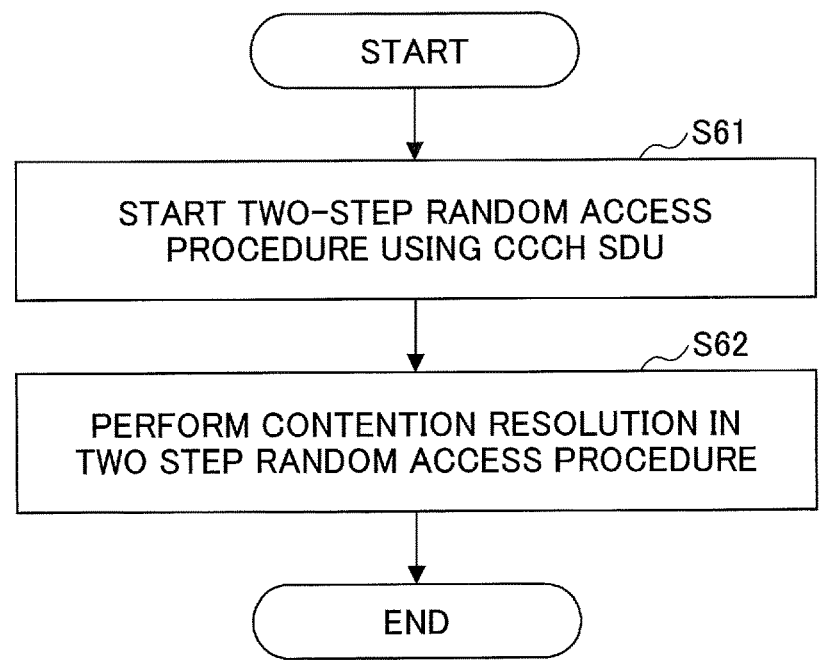
FIG. 9 is a flow chart for describing a second example of a random access procedure according to an embodiment of the present invention.

FIG. 9 is a flow chart for describing a second example of a random access procedure according to an embodiment of the present invention. By using FIG. 9, a two-step random access procedure without using a CCCH SDU will be described.

In step S61, the user equipment 20 starts a two-step random access procedure using a CCCH SDU. In step S62, the user equipment 20 performs a contention resolution in a two-step random access procedure.

The contention resolution in step S62 may be performed by transmitting a part of a UE ID or an entire UE ID transmitted by a MsgA, which is equivalent to a CCCH SDU transmitted by a Msg3 in a four-step random access procedure, through a MAC CE in DL transmitted by methods described in the following 1) to 3). In the following description, "MAC CE" includes a part of a UE ID or an entire UE ID transmitted by a MsgA, which is equivalent to a CCCH SDU transmitted by a Msg3 in a four-step random access procedure.

1) A DL assignment may be indicated by a random access response. A MAC CE is indicated via DL assigned by the DL assignment. The user equipment 20 receives a MsgB similar to a Msg2 and an existing "UL Grant" field may be read as a DL assignment. A value of a "Temporary C-RNTI" field may be read as information about a DL assignment (for example, resource or timing information of a feedback to a random access response (which is a HARQ ACK for example)). When a DL assignment is indicated by a random access response, a MAC sub header or a payload of the random access response may indicate that the random access response is for a two-step random access procedure in which a part of a UE ID or an entire UE ID are transmitted by a MsgA, which is equivalent to a CCCH SDU. The MsgB similar to the Msg2 may be a MsgB using a PDU (Protocol Data Unit) format (i.e., a payload of a random access response) of an existing Msg2 (i.e., a random access response), and may be a MsgB using a part of or all of information equivalent to information transmitted by an existing Msg2.

2) Separately from a random access response, a MAC CE may be transmitted. A MAC sub header or a payload of a random access response may indicate that the MAC CE is transmitted.

3) A part of MAC CE information may be transmitted by a random access response. Elements of a part of a MAC CE or an entire MAC CE are mapped to specific fields (e.g., "UL Grant", "Temporary C-RNTI", and so on) of a random access response. The user equipment 20 determines whether a contention resolution is successful based on a part of or all of bit sequences mapped by the MAC CE.

In 1) and 2 described above, the random access response and the MAC CE may be transmitted and received in different frequencies or different time resources.

From the embodiments described above, the user equipment 20 can perform a contention resolution by decoding data scrambled by a C-RNTI or obtaining a C-RNTI, when a CCCH SDU is not used in a two-step random access procedure. The user equipment 20 can perform a contention resolution by obtaining a MAC CE based on a random access response when a CCCH SDU is used in a two-step random access procedure.

That is, a contention resolution in a contention based random access procedure can be performed.

(Apparatus Configuration)

Next, an example of the functional configurations of the base station apparatus 10 and the user equipment 20 performing the processes and operations described above will be described. The base station apparatus 10 and the user equipment 20 include functions for performing the embodiments described above. However, each of the base station apparatus 10 and the user equipment 20 may include only a part of functions in the embodiments.

<The Base Station Apparatus 10>

Figure 10:
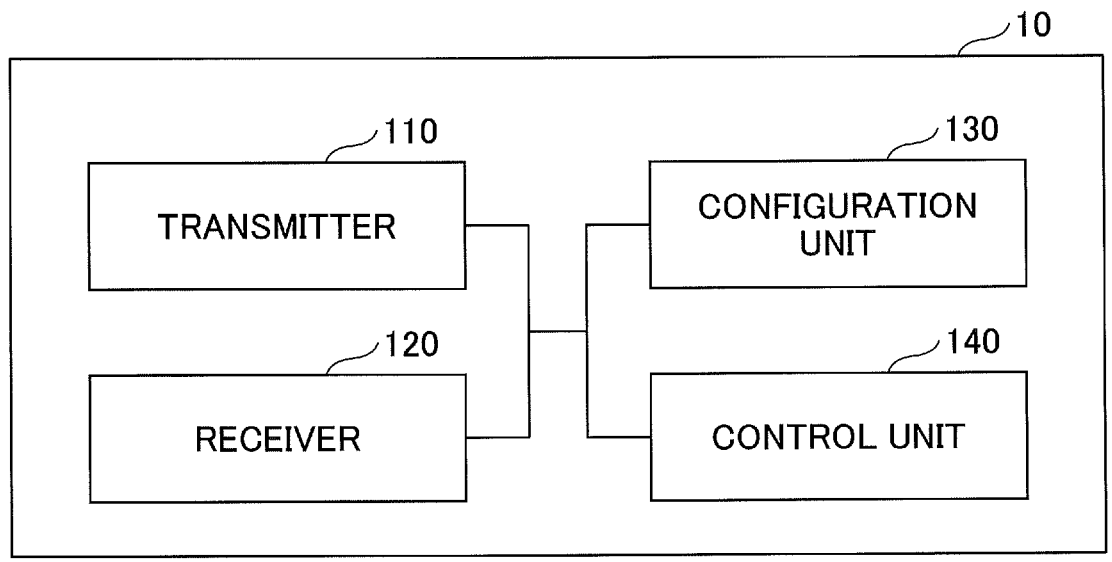
FIG. 10 is a diagram illustrating an example of a functional configuration of a base station apparatus 10 according to an embodiment of the present invention.

FIG. 10 is a diagram illustrating an example of a functional configuration of the base station apparatus 10. As illustrated in FIG. 10, the base station apparatus 10 includes a transmitter 110, a receiver 120, a configuration unit 130, and a control unit 140. The functional configuration illustrated in FIG. 10 is merely an example. The functional division and names of the functional units are not limited as long as the operations according to the embodiment of the present invention can be performed.

The transmitter 110 includes functions to generate a signal to be transmitted to the user equipment 20, and to transmit the signal wirelessly. The receiver 120 includes functions to receive various types of signals transmitted from the user equipment 20, and to obtain information of upper layers from the received signal, for example. The transmitter 110 includes a function to transmit an NR-PSS, an NR-SSS, an NR-PBCH, a DL/UL control signal, a DL/UL data signal, and the like to the user equipment 20.

The configuration unit 130 stores pre-configured configuration information, and various configuration information to be transmitted to the user equipment 20 in a storage device, and reads from the storage device as needed. Contents of the configuration information include a configuration concerning a random access, for example.

The control unit 140 performs a two-step random access procedure or a four-step random access procedure with the user equipment 20 as described in the embodiments. Functional units concerning signal transmission in the control unit 140 may be incorporated in the transmitter 110, and functional units concerning signal reception in the control unit 140 may be incorporated in the receiver 120.

<The User Equipment 20>

Figure 11:
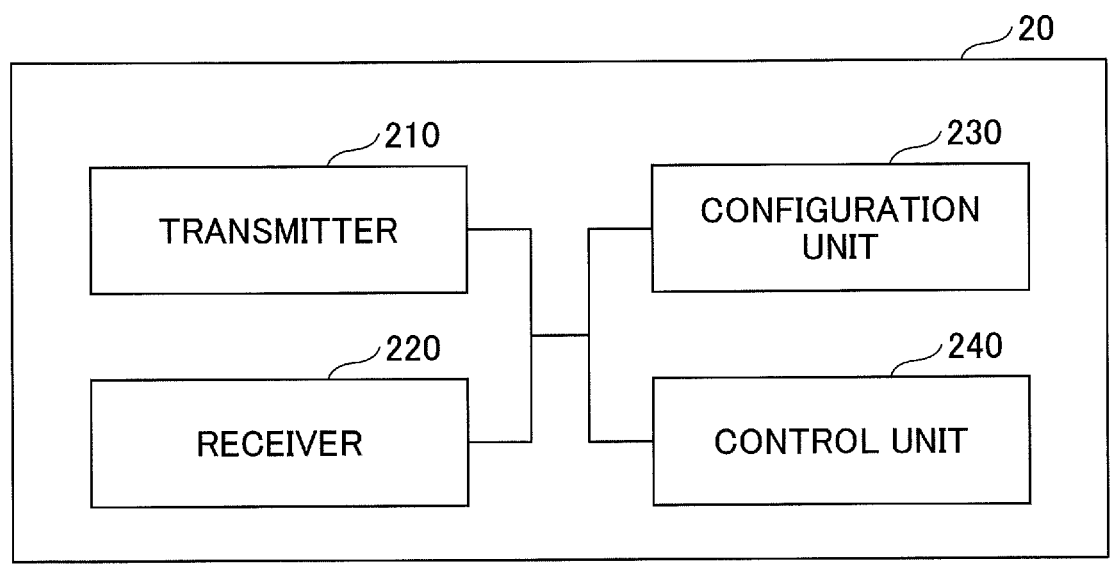
FIG. 11 is a diagram illustrating an example of a functional configuration of user equipment 20 according to an embodiment of the present invention.

FIG. 11 is a diagram illustrating an example of a functional configuration of the user equipment 20. As illustrated in FIG. 11, the user equipment 20 includes a transmitter 210, a receiver 220, a configuration unit 230, and a control unit 240. The functional configuration illustrated in FIG. 11 is merely an example. The functional division and names of the functional units are not limited as long as the operations according to the embodiment of the present invention can be performed.

The transmitter 210 generates a transmission signal from data to be transmitted, and transmits the transmission signal wirelessly. The receiver 220 receives various types of signals wirelessly, and obtains a signal of an upper layer from the received signal of a physical layer. The receiver 220 includes a function to receive an NR-PSS, an NR-SSS, an NR-PBCH, a DL/UL/SL control signal, and the like transmitted from the base station apparatus 10. For example, the transmitter 210 transmits a physical sidelink control channel (PSCCH), a physical sidelink control channel (PSSCH), a physical sidelink discovery channel (PSDCH), a physical sidelink broadcast channel (PSBCH) or the like to another user equipment 20, as D2D communication, and the receiver 120 receives a PSCCH, a PSSCH, a PSDCH, a PSBCH, or the like from another user equipment 20.

The configuration unit 230 stores various configuration information that the receiver 220 receives from the base station apparatus 10 or the user equipment 20, in a storage device, and reads from the storage device as needed. The configuration unit 230 also stores pre-configured configuration information. Contents of the configuration information include a configuration concerning a random access, for example.

The control unit 240 performs a two-step random access procedure or a four-step random access procedure with the base station apparatus 10 as described in the embodiments.

Functional units concerning signal transmission in the control unit 240 may be incorporated in the transmitter 210, and functional units concerning signal reception in the control unit 240 may be incorporated in the receiver 220.

<A Hardware Configuration>

The block diagrams used to describe the embodiment above (which are FIG. 10 and FIG. 11) illustrate blocks of functional units. The functional blocks (components) are implemented by any combination of hardware, software, or both. A means for implementing each functional block is not particularly limited. That is, each functional block may be implemented by one apparatus in which components are physically or logically coupled, or by multiple apparatuses that are two or more apparatuses physically or logically separated from each other and connected directly or indirectly (with a wire connection or a wireless connection, for example). A functional block may be implemented by a combination of one apparatus described above or multiple apparatuses described above, and software.

A function includes determining, deciding, judging, calculating, computing, processing, deriving, investigating, looking up, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, and assigning, but is not limited to these. A functional block (component) that functions transmission is called a transmitting unit or a transmitter, for example. As described above, a means for implementing a transmitting unit and a transmitter is not limited.

Figure 12:
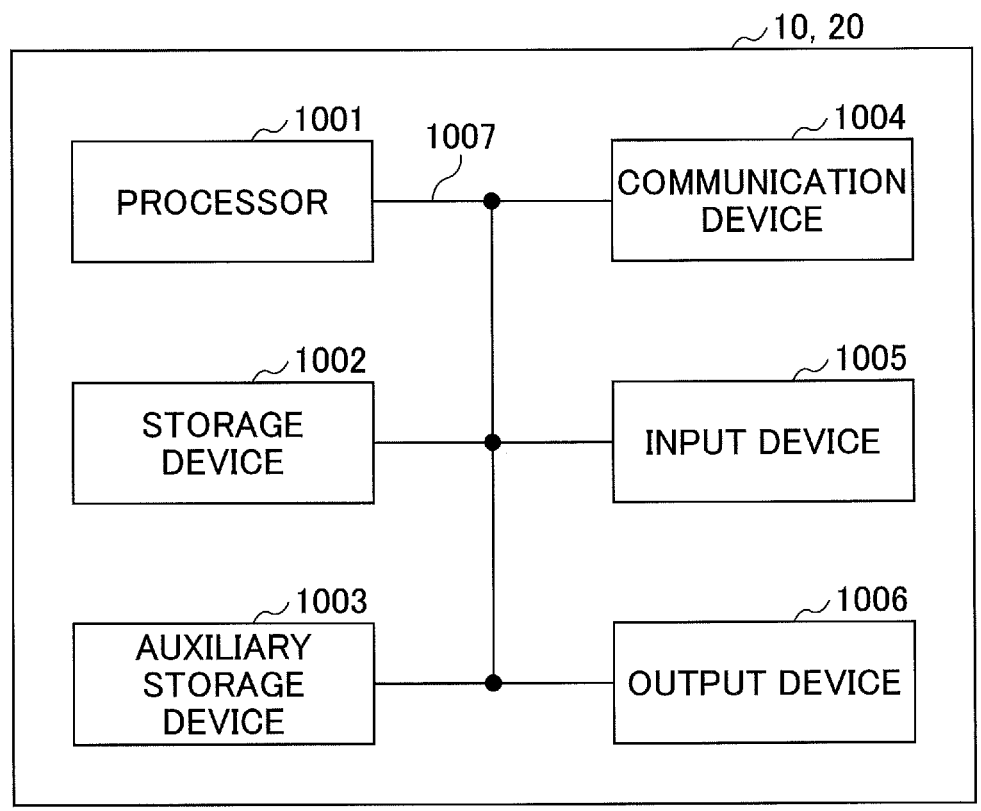
FIG. 12 is a diagram illustrating an example of a hardware configuration of a base station apparatus 10 or user equipment 20 according to an embodiment of the present invention.

The base station apparatus 10, the user equipment 20, or the like according to an embodiment of the present disclosure may function as a computer that performs a process of a radio communication method of the present disclosure, for example. FIG. 12 is a diagram illustrating an example of a hardware configuration of the base station apparatus 10 and the user equipment 20 according to an embodiment of the present disclosure. The base station apparatus 10 and the user equipment 20 described above may be configured as a computer apparatus that physically includes a processor 1001, a storage device 1002, an auxiliary storage device 1003, a communication device 1004, an input device 1005, an output device 1006, and a bus 1007.

In the following description, a word "device" can be referred to as a circuit, a device, a unit, or the like. The hardware configurations of the base station apparatus 10 and the user equipment 20 may include one or more devices illustrated in the drawing or may not include some devices.

Each function of the base station apparatus 10 and the user equipment 20 is implemented by the following process: predetermined software (program) is loaded into hardware such as the processor 1001 and the storage device 1002, and the processor 1001 performs an operation to control communication of the communication device 1004 and at least one of reading and writing of data in the storage device 1002 and the auxiliary storage device 1003.

The processor 1001 operates, for example, an operating system to control an overall operation of the computer. The processor 1001 may be a central processing unit (CPU) including, for example, an interface with peripheral devices, a control device, an arithmetic device, and a register. For example, the control unit 140, the control unit 240, and so on described above may be implemented by the processor 1001.

The processor 1001 loads a program (program code), a software module, data, or the like from at least one of the auxiliary storage device 1003 and the communication device 1004 into the storage device 1002 and performs various types of processes according to the program, the software module, the data, or the like. A program that causes a computer to perform at least some of the operations described in the embodiment above may be used. For example, the control unit 140 of the base station apparatus 10 illustrated in FIG. 10 may be implemented by a control program that is stored in the storage device 1002 and that is executed by the processor 1001. For example, the control unit 240 of the user equipment 20 illustrated in FIG. 11 may be implemented by a control program that is stored in the storage device 1002 and that is executed by the processor 1001. It is described that the various processes described above are performed by one processor 1001; however the processes may be simultaneously or sequentially performed by two or more processors 1001. The processor 1001 may be implemented by one or more chips. The program may be transmitted over a network through a telecommunication line.

The storage device 1002 is a computer-readable recording medium, and may include, for example, at least one of a read only memory (ROM), an erasable programmable ROM (EPROM), an electrically erasable programmable ROM (EEPROM), and a random access memory (RAM). The storage device 1002 may be also referred to as, for example, a register, a cache, or a main memory (a main storage device). The storage device 1002 can store, for example, an executable program (program code) and a software module so as to perform a communication method according to the embodiment of the disclosure.

The auxiliary storage device 1003 is a computer-readable recording medium, and may include, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage medium described above may be, for example, a database, a server, and other suitable media including at least one of the storage device 1002 and the auxiliary storage device 1003.

The communication device 1004 is hardware (a transmission and reception device) for communicating with a computer through at least one of a wired network and a wireless network, and is also referred to as, for example, a network device, a network controller, a network card, or a communication module. In order to achieve at least one of a frequency division duplex (FDD) and a time division duplex (TDD), for example, the communication device 1004 may include a high-frequency switch, a duplexer, a filter, and a frequency synthesizer. For example, a transmission and receiving antenna, an amplifier unit, a transmission and receiving unit, a transmission channel interface and the like may be implemented by the communication device 1004. A transmission and receiving unit may be implemented by being physically or logically separated into a transmission unit and a receiving unit.

The input device 1005 is an input unit that receives an input from the outside (for example, a keyboard, a mouse, a microphone, a switch, a button, or a sensor). The output device 1006 is an output unit that performs an output process to the outside (for example, a display, a speaker, or an LED lamp). The input device 1005 and the output device 1006 may be integrated into a single device (for example, a touch panel).

Devices such as the processor 1001 and the storage device 1002 are connected to each other through the bus 1007 for communicating information. The bus 1007 may be a single bus or the devices may be connected to each other by different buses.

The base station apparatus 10 and the user equipment 20 may include hardware such as a microprocessor, a digital signal processor (DSP), an application specific integrated circuit (ASIC), a programmable logic device (PLD), and a field programmable gate array (FPGA), and some or all of the functional blocks may be implemented by the hardware. For example, the processor 1001 may be implemented by at least one of these hardware components.

SUMMARY OF THE EMBODIMENT

As described above, according to the embodiment of the present invention, user equipment including a transmitter that transmits a random access preamble or an identifier of the user equipment to a base station apparatus in a two-step-random access procedure, a receiver that receives a response signal corresponding to at least one of the random access preamble and the identifier of the user equipment, and a downlink signal based on the response signal, from the base station apparatus, and control unit that determines that a contention resolution is successful when information included in the downlink signal matches a part of or all of the identifier of the user equipment, is provided.

From the configuration above, the user equipment 20 can perform a contention resolution by obtaining a MAC CE based on a random access response when a CCCH SDU is used in a two-step random access procedure. That is, a contention resolution in a contention based random access procedure can be performed.

The response signal may include an allocation of the downlink signal. This configuration enables the user equipment 20 to perform a contention resolution by obtaining a MAC CE.

The response signal may include information indicating that a two-step random access procedure is being performed. This configuration enables the user equipment 20 to perform a contention resolution by obtaining a MAC CE.

The response signal and the downlink signal may be received in different frequency domains or different time domains. According to this configuration, with respect to the user equipment 20, flexible arrangement of the MAC CE can be improved.

In addition, according to the embodiment of the present invention, a base station apparatus including a receiver that receives at least one of a random access preamble and an identifier of user equipment from the user equipment in a two-step-random access procedure, a control unit that stores a part of or all of the identifier of the user equipment in information included in a downlink signal, and a transmitter that transmits a response signal corresponding to at least one of the random access preamble and an identifier of the base station apparatus, and the downlink signal based on the response signal, to the user equipment, is provided.

From the configuration above, the user equipment 20 can perform a contention resolution by obtaining a MAC CE based on a random access response when a CCCH SDU is used in a two-step random access procedure. That is, a contention resolution in a contention based random access procedure can be performed.

(Supplementary Explanation of the Embodiment)

The embodiment of the present invention has been described above. However, the disclosed invention is not limited to the embodiment and it will be understood by those skilled in the art that various variations, modifications, alterations, substitutions, and so on can be made. Specific numerical examples are used for the description to facilitate the understanding of the invention. However, the numerical values are merely examples and any appropriate values may be used, unless otherwise stated. The classification of the sections in the description above is not essential in the invention and matters described in two or more sections may be combined and used, if necessary. Matters described in one section may be applied to matters described in another section (unless a contradiction arises). The boundaries between the functional units or the processing units in the functional block diagram do not necessarily correspond to the boundaries between physical components. The operation of a plurality of functional units may be physically performed by one component. Alternatively, the operation of one functional unit may be physically performed by a plurality of components. In the procedures described in the embodiment, the order of the processes may be changed unless a contradiction arises. For convenience of explanation of the processes, the base station apparatus 10 and the user equipment 20 have been described with reference to the functional block diagrams. However, the apparatuses may be implemented by hardware, software, or a combination thereof. Each of the software that is operated by the processor included in the base station apparatus 10 according to the embodiment of the present invention and the software that is operated by the processor included in user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, and other suitable storage media.

The transmission of information is not limited to the aspects/embodiments described in the disclosure and may be performed by other means. For example, the transmission of information may be performed by physical layer signaling (for example, downlink control information (DCI) and uplink control information (UCI)), upper layer signaling (for example, radio resource control (RRC) signaling, medium access control (MAC) signaling, or broadcast information (a master information block (MIB) and an system information block (SIB)), another signal, or a combination thereof. The RRC signaling may be also referred to as an RRC message and may be, for example, an RRC connection setup message or an RRC connection reconfiguration message.

Each aspect/embodiment described in the disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using other suitable systems, and a next-generation system that has functionality enhanced based on these systems. In addition, each aspect/embodiment described in the disclosure may be applied to combined systems (for example, a combination of at least one of LTE and LTE-A, and 5G).

In a processing order, sequence, flow chart, and so on of each aspect/embodiment described in the specification, the order may be changed unless a contradiction arises. For example, a means described in the disclosure indicates elements of various steps by using an exemplary order, and is not limited to a specific order that is indicated.

In the specification, a specific operation performed by the base station apparatus 10 may be performed by an upper node of the base station apparatus. In a network having one or a plurality of network nodes including the base station apparatus 10, it is clearly understood that various operations performed for communication with the user equipment 20 can be performed by at least one of the base station apparatus 10 and a network node other than the base station apparatus 10 (for example, an MME or an S-GW are included, but not limited to these). In the description above, one network node other than the base station apparatus 10 is described as an example, but other network node may be a combination of a plurality of other network nodes (for example, an MME and an S-GW)

Information, a signal or the like described in the disclosure can be output from an upper layer (or a lower layer) to a lower layer (or an upper layer), and may be input or output through a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

Determination in the disclosure may be made based on a value represented by 1 bit (0 or 1), may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, information, or the like may be transmitted or received via a transmission medium. For example, when software is transmitted from a website, a server, or another remote source using at least one of a wired technology (for example, a coaxial cable, an optical cable, a twisted pair, and a digital subscriber line (DSL)) and a wireless technology (for example, an infrared ray, and microwaves), at least one of the wired technology and the wireless technology is included in the definition of a transmission medium.

Information, a signal, and the like described in the disclosure may be represented by using any of various technologies. For example, data, an instruction, a command, information, a signal, a bit, a symbol, a chip, and the like that can be mentioned throughout the description above may be represented by a voltage, a current, an electromagnetic wave, a magnetic field or a magnetic particle, an optical field or a photon, or any combination thereof.

The terms described in the disclosure and terms necessary to understand the disclosure may be replaced with terms that have same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the disclosure are interchangeably used.

Information, a parameter, and the like described in the disclosure may be represented by using an absolute value, a relative value from a predetermined value, or another corresponding information. For example, a radio resource may be indicated by an index.

Names used for parameters described above are not limited in any respect. Further, a numerical expression or the like in which the parameters are used can be different from the numerical expression disclosed explicitly in the disclosure. Since various channels (for example, a PUCCH and a PDCCH) and information elements can be identified by any suitable names, various names allocated to the various channels and the information elements are not limited in any respect.

In the disclosure, the terms "base station (BS)", "wireless base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be interchangeably used. A base station may be referred to as a macro cell, a small cell, a femtocell, a picocell, or the like.

A base station can accommodate one or more (for example, three) cells. When a base station accommodates a plurality of cells, an entire coverage area of the base station can be divided into a plurality of small areas, and in each small area, a communication service can be provided through a base station subsystem (for example, a small indoor base station remote radio head (RRH)). The term "cell" or "sector" refers to a part or whole of the coverage area in which at least one of the base station and the base station subsystem provides a communication service.

In the disclosure, the terms "mobile station (MS)", "user terminal", "user equipment (UE)", and "terminal" can be interchangeably used.

In some cases, a mobile station is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

At least one of a base station and a mobile station may be referred to as a transmission apparatus, a receiving apparatus, a communication apparatus, and the like. At least one of a base station and a mobile station may be a device installed in a mobile object or a mobile object itself. The mobile object may be a vehicle (for example, a car and an airplane), may be an unmanned mobile object (for example, a drone and a self-driving car), and may be a robot (manned or unmanned). At least one of a base station and a mobile station includes an apparatus that does not necessarily move at a communication operation. For example, at least one of a base station and a mobile station may be an Internet of Things (IoT) device such as a sensor.

The base station in the disclosure may be referred to as a user terminal. For example, each aspect/embodiment described in the disclosure may be applied to a configuration in which communication between a base station and a user terminal is replaced with communication between a plurality of user equipment 20 (which may be referred to as Device-to-Device (D2D) and Vehicle-to-Everything (V2X), for example). In this case, the user equipment 20 may include a function included in the base station apparatus 10 described above. Words "uplink" and "downlink" may be referred to as words for terminal-to-terminal communication (for example, "side"). For example, an uplink channel, a downlink channel, and the like may be referred to as a side channel.

Similarly, the user terminal in the disclosure may be referred to as a base station. In this case, the base station may include a function included in the user terminal described above.

The terms "determining" and "deciding" used in the disclosure may include various operations. The terms "determining" and "deciding" can include, for example, "determination" and "decision" for judging, calculating, computing, processing, deriving, investigating, looking-up (search and inquiry) (for example, looking-up in a table, a database, or another data structure), and ascertaining operations. In addition, the terms "determining" and "deciding" can include "determination" and "decision" for receiving (for example, receiving information), transmitting (for example, transmitting information), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation. In addition, the term "determination" (or "deciding") may be referred to as, for example, "assuming", "expecting", and "considering".

The terms "connected" and "coupled", or all variations thereof indicate any direct or indirect connection or coupling between two or more elements, and can include existence of one or more intermediate elements between two mutually "connected" or "coupled" elements. The coupling or connection between elements may be physical, logical or in combinations thereof. The term "connection" may be referred to as "access" for example. When "connected" or "coupled" is used in the disclosure, it can be considered that two elements are mutually "connected" or "coupled", for example, with use of one or more electric wires, cables, print electric connections, or any combination thereof, and as several non-limiting and non-comprehensive examples, with use of electromagnetic energy or the like having a wavelength of a radio frequency domain, a microwave domain, and an optical (both visible and invisible) domain.

A reference signal can be omitted as a RS and may be referred to as a pilot depending on an applied standard.

The description "based on" used in the disclosure does not indicate "only based on" unless otherwise described. In other words, the description "based on" indicates both "only based on" and "at least based on".

Any reference to elements with use of terms "first," "second," and the like used in the disclosure does not limit the amount or the order of the elements in general. These terms can be used in the disclosure as a convenient method to distinguish two or more elements from each other. Accordingly, reference to first and second elements does not indicate that only two elements are used or the first element has to be prior to the second element in some ways.

The term "means" in a configuration of each apparatus described above may be replaced with "unit", "circuit", "device" or the like.

When the terms "include" and "including" and the modifications thereof are used in the disclosure, these terms are intended to be inclusive, similarly as the term "comprising". In addition, the term "or" used in the disclosure is intended not to be an exclusive OR.

A radio frame may be formed by one or more frames in the time domain. Each of one or more frames in the time domain may be also referred to as a "subframe". Further, the subframe may be formed by one or more slots in the time domain. The subframe may be a fixed time length (for example, 1 ms) that is independent of a numerology.

The numerology may be a communication parameter which is applied to at least one of transmission and reception of a signal or a channel. A numerology may indicate, for example, at least one of a subcarrier spacing, a bandwidth, a symbol length, a cyclic prefix length, a transmission time interval, the number of symbols per a TTI, a radio frame configuration, a specific filtering process performed by a transceiver in the frequency domain, a specific windowing process performed by a transceiver in the time domain.

A slot may be formed by one or more symbols (orthogonal frequency division multiplexing (OFDM) symbols, a single carrier frequency division multiple access (SC-FDMA) symbols, or the like) in the time domain. A slot may be a time unit based on a numerology.

A slot may include a plurality of mini slots. Each mini slot may be formed by one or more symbols in the time domain. A mini slot may be referred to as a sub-slot. A mini slot may be formed by a smaller number of symbols than a slot. A PDSCH (or PUSCH) transmitted in a time unit that is larger than a mini slot may be referred to as a PDSCH (or PUSCH) mapping type A. A PDSCH (or PUSCH) transmitted by using a mini slot may be referred to as a PDSCH (or PUSCH) mapping type B.

Each of the radio frame, the subframe, the slot, and the symbol represents a time unit in which a signal is transmitted. For the radio frame, the subframe, the slot, the mini slot, and the symbol, different corresponding names may be used.

For example, one subframe may be referred to as a transmission time interval (TTI), a plurality of consecutive subframes may be referred to as a TTI, and one slot or one mini slot may be referred to as a TTI. Thus, at least one of a subframe and a TTI may be a subframe of the existing LTE (1 ms), may be a shorter duration than 1 ms (for example, 1 to 13 symbols, or may be a longer duration than 1 ms. A unit representing a TTI may be called "slot" or "mini slot", for example, instead of "subframe".

A TTI indicates, for example, a minimum time unit of scheduling in radio communication. In an LTE system, for example, a base station performs scheduling per a TTI to allocate a radio resource (a frequency bandwidth, transmission power, or the like which can be used by each user equipment 20) to each user equipment 20. The definition of a TTI is not limited to this.

A TTI may be a transmission time unit of a channel coding data packet (a transport block), a code block, a code word, and the like, and may be a processing unit of scheduling, link adaptation, and the like. When a TTI is given, a time section (for example, the number of symbols) to which a transport block, a code block, a code word, or the like is actually mapped, may be shorter than the TTI.

When one slot or one mini slot is called a TTI, one or more TTIs (that is, one or more slots or mini slots) may be a minimum time unit of scheduling. The number of slots (or mini slots) included in the minimum time unit of scheduling may be controlled.

A TTI with 1 ms time length may be referred to as a normal TTI (a TTI of LTE Rel. 8-12), a normal TTI, a long TTI, a normal subframe, a long subframe, a slot, and the like. A TTI shorter than a normal TTI may be referred to as a shortened TTI, a short TTI, a partial TTI (or a fractional TTI), a shortened subframe, a short subframe, a mini slot, a sub-slot, a slot, and the like.

A long TTI (for example, a normal TTI or a subframe) may be replaced with a TTI having more than 1 ms time length, and a short TTI (for example, a shortened TTI) may be replaced with a TTI having TTI length that is shorter than a long TTI and longer or equal to 1 ms.

A resource block (RB) is a resource allocation unit in the time domain and the frequency domain and may include one or more consecutive subcarriers in the frequency domain. The number of subcarriers included in a RB may be the same regardless of a numerology, and may be 12 for example. The number of subcarriers included in a RB may be determined based on a numerology.

The time domain of the resource block may include one or more symbols, and may be a length of one slot, one mini slot, one subframe, or one TTI. Each of one TTI, one subframe and the like may be formed by one or more resource blocks.

One or more RBs may be referred to as a physical RB (PRB), a sub-carrier group (SCG), a resource element group (REG), a PRB pair, a RB pair, and the like.

A resource block may be formed by one or more resource elements. For example, 1 RE may be a radio resource area for one sub-carrier and one symbol.

A bandwidth part (which may be referred to as a part bandwidth, for example) may represent a subset of a consecutive common resource blocks (common RB) for a numerology in a carrier. A common RB may be determined by an index of a RB based on a common reference point of the carrier. A PRB may be defined by a BWP and may be numbered in the BWP.

A BWP may include a UL BWP and DL BWP. One or more BWPs may be configured in one carrier to UE.

At least one configured BWP may be active, and UE does not have to assume transmission and reception of a predetermined signal/channel outside of the active BWP. Terms "cell" and "carrier" in the disclosure may be referred to as "BWP".

The structures of the radio frame, the sub frame, the slot, the mini slot, the symbol, and the like described above are merely examples. For example, the number of subframes included in the radio frame, the number of slots per a subframe or a radio frame, the number of mini slots included in the slot, the number of symbols and RBs included in the slot or the mini slot, the number of subcarriers included in the RB, and also the number of symbols in the TTI, a symbol length, and a cyclic prefix (CP) length can be modified in any manner.

In the disclosure, for example, when an article, such as "a", "an", or "the", in English is added by translation, noun followed by the article may include the meaning of the plural in the disclosure.

In the disclosure, the term "A and B are different" may indicate "A and B are different from each other". The term may also indicate "each of A and B is different from C". The terms "separated", "combined, and the like may be similarly interpreted.

The aspects/embodiments described in the disclosure may be individually used, may be combined, or may be switched during execution. In addition, transmission of predetermined information (for example, transmission of "being X") is not limited to being performed explicitly, but may be performed implicitly (for example, the transmission of the predetermined information is not performed).

In the disclosure, a UE ID or C-RNTI is an example of an identifier of a user equipment. A MsgB is an example of a response signal.

The disclosure has been described in detail above. It will be apparent to those skilled in the art that the disclosure is not limited to the embodiments described in the disclosure. Various modifications and changes can be made, without departing from the scope and spirit of the disclosure described in the claims. Therefore, the description in the disclosure is made for illustrative description and does not have any restrictive meaning to the disclosure.

DESCRIPTION OF REFERENCE SIGNS

10 base station apparatus
110 transmitter
120 receiver
130 configuration unit
140 control unit
20 user equipment
210 transmitter
220 receiver
230 configuration unit
240 control unit
1001 processor
1002 storage device
1003 auxiliary storage device
1004 communication device
1005 input device
1006 output device

The invention claimed is:

1. A terminal comprising:
a transmitter configured to transmit a random access preamble and information for identifying the terminal to a base station in a two-step random access procedure;
a receiver configured to receive a response signal in the two-step random access procedure from the base station; and
a processor configured to determine that a contention resolution is successful when information included in the response signal matches at least a part of the information for identifying the terminal,
wherein the transmitter separates a resource position used for transmitting the random access preamble in the two-step random access procedure from a resource position used for transmitting the random access preamble in a four-step random access procedure in a time domain.

2. A wireless communication system comprising: a terminal; and a base station, wherein
the terminal includes:
a transmitter configured to transmit a random access preamble and information for identifying the terminal to the base station in a two-step random access procedure;
a receiver configured to receive a response signal in the two-step random access procedure from the base station; and
a processor configured to determine that a contention resolution is successful when information included in the response signal matches at least a part of the information for identifying the terminal,
wherein the transmitter separates a resource position used for transmitting the random access preamble in the two-step random access procedure from a resource position used for transmitting the random access preamble in a four-step random access procedure in a time domain, and the base station includes:
a receiver configured to receive the random access preamble and information for identifying the terminal from the terminal in the two-step random access procedure; and
a transmitter configured to transmit the response signal in the two-step random access procedure to the terminal.

3. A communication method executed by a terminal, the communication method comprising:
transmitting a random access preamble and information for identifying the terminal to a base station in a two-step random access procedure;
receiving a response signal in the two-step random access procedure from the base station;
determining that a contention resolution is successful when information included in the response signal matches at least a part of the information for identifying the terminal; and
separating a resource position used for transmitting the random access preamble in the two-step random access procedure from a resource position used for transmitting the random access preamble in a four-step random access procedure in a time domain.

* * * * *